(12) United States Patent
Grove, III

(10) Patent No.: US 10,066,153 B2
(45) Date of Patent: Sep. 4, 2018

(54) RESIN-COATED SUBSTRATE COMPOSITIONS AND METHODS OF MAKING THE SAME

(71) Applicant: U.S. SILICA COMPANY, Frederick, MD (US)

(72) Inventor: Dale Addison Grove, III, Hagerstown, MD (US)

(73) Assignee: U.S. Silica Company, Frederick, MD (US)

( * ) Notice: Subject to any disclaimer, the term of this patent is extended or adjusted under 35 U.S.C. 154(b) by 161 days.

(21) Appl. No.: 14/712,832

(22) Filed: May 14, 2015

(65) Prior Publication Data

US 2015/0329768 A1    Nov. 19, 2015

Related U.S. Application Data

(60) Provisional application No. 61/994,040, filed on May 15, 2014.

(51) Int. Cl.
| | |
|---|---|
| *C09K 8/62* | (2006.01) |
| *C09K 8/80* | (2006.01) |
| *B05D 3/00* | (2006.01) |
| *B22C 1/02* | (2006.01) |

(52) U.S. Cl.
CPC .............. *C09K 8/805* (2013.01); *B05D 3/002* (2013.01); *B22C 1/02* (2013.01)

(58) Field of Classification Search
CPC ....................................................... C09K 8/805
USPC ........................................................ 507/220
See application file for complete search history.

(56) References Cited

U.S. PATENT DOCUMENTS

| | | | |
|---|---|---|---|
| 4,216,133 A | 8/1980 | Johnson et al. | |
| 4,427,567 A | 1/1984 | Benz | |
| 4,830,641 A * | 5/1989 | White, Jr. ............. | B01D 53/02 96/130 |
| 2003/0158290 A1 | 8/2003 | LaFay et al. | |
| 2007/0036977 A1 | 2/2007 | Sinclair et al. | |
| 2013/0056204 A1 | 3/2013 | McDaniel et al. | |

FOREIGN PATENT DOCUMENTS

GB    923771    4/1963

OTHER PUBLICATIONS

Lytle, C. et al., "Determination of Thermal Decomposition Products from a Phenolic Urethane Resin by Pyrolysis—Gas Chromatography—Mass Spectrometry", J. High Resol. Chromatr., Feb. 1998, vol. 21, p. 128.
International Search Report and Written Opinion of the International Searching Authority dated Aug. 4, 2015, issued in corresponding Application No. PCT/US2015/030915, 9 pages.
Office action dated Dec. 19, 2017, issued in corresponding Canadian Patent Application No. 2,949,235, 3 pages.
International Preliminary Report on Patentability (Chapter II the Patent Cooperation Treaty) issued in PCT/US15/30915 dated Jul. 29, 2016, 19 pages.

* cited by examiner

*Primary Examiner* — Aiqun Li
(74) *Attorney, Agent, or Firm* — Lewis Roca Rothgerber Christie LLP

(57) ABSTRACT

A resin-coated substrate composition includes a resin-coated substrate comprising a particulate substrate coated with a polymer resin, and an additive comprising bentonite or a zeolite. A method of preparing a resin-coated substrate composition includes heating a particulate substrate, and mixing the heated substrate with a polymer resin and an additive such as bentonite or a zeolite. In some embodiments, a foundry sand composition includes the resin-coated substrate composition. In some embodiments, a proppant sand composition includes the resin-coated substrate composition.

20 Claims, No Drawings

RESIN-COATED SUBSTRATE COMPOSITIONS AND METHODS OF MAKING THE SAME

CROSS-REFERENCE TO RELATED APPLICATION(S)

This application claims priority to and the benefit of U.S. Provisional Application Ser. No. 61/994,040, filed on May 15, 2014 and titled RESIN-COATED SUBSTRATE COMPOSITIONS INCLUDING ZEOLITE PARTICLES AND RELATED METHODS AND SYSTEMS, the entire content of which is incorporated herein by reference.

BACKGROUND

Particulate substrates, e.g., sand or silica-based sand, are useful in many applications, including foundry sands and proppants for oil fracturing applications. To improve their efficacy in these applications, the particulate substrates are often treated or coated. For example, to improve the compressive strength of these particulate substrates, and thereby increase their efficacy as, e.g., foundry sands or proppants, the particulate substrates are often coated with a resin. While several resins are used to achieve this goal, the most common are novolac (excess phenol) and resole (excess formaldehyde) resins, which are formed from the reaction of phenol with formaldehyde. However, coating the particulate substrates with these resins generates volatile organic compounds (VOCs) which are damaging to users of these products and to the environment. As such, maximum VOC levels are heavily regulated. Additionally, novolacs require a cross-linker or hardener to complete the coating process. A common cross-linker used in these applications is hexamethylene tetramine, which produces ammonia and formaldehyde reactants prior to and during the cross-linking reaction. As these gasses can be odorous and produce toxic VOCs, systems and methods for resin coating particulate substrates that reduce or eliminate them are highly desirable.

SUMMARY

According to embodiments of the present invention, a composition includes a resin-coated substrate and an additive for reducing VOCs and/or mitigating or substantially eliminating odors caused by, e.g., the production of ammonia, formaldehyde and/or phenol. In some embodiments, the additive may include bentonite and/or a zeolite. In some embodiments, the additive, e.g., the bentonite and/or zeolite, may be present in the composition an amount of about 0.03 wt % to about 0.5 wt % based on the weight of the resin-coated substrate. In some embodiments, for example, the additive may be present in an amount of about 0.035 wt % to about 0.25 wt % based on the total weight of the resin-coated substrate. In some embodiments, the additive may be present in an amount of 0.035 wt %, about 0.05 wt %, about 0.1 wt %, about 0.15 wt %, about 0.2 wt %, or about 0.025 wt % based on the total weight of the resin-coated substrate.

Any suitable bentonite clay may be used as the additive. For example, in some embodiments, about 50% to about 90% of the particles in the bentonite clay may have a particle size of about 200 mesh or less. In some embodiments, for example, about 60% to about 80%, about 60% to about 70%, or about 65% to about 68% of the particles in the bentonite clay may have a particle size of about 200 mesh or less. For example, in some embodiments, about 65% or about 67.5% of the particles in the bentonite clay may have a particle size of about 200 mesh or less. In some embodiments, for example, about 50% to about 90%, about 60% to about 80%, about 60% to about 70%, about 65% to about 68%, about 65%, or about 67.5% of the particles in the bentonite clay may have a particle size of about 100 mesh to about 200 mesh, or about 150 mesh to about 200 mesh.

The zeolite may be any zeolite having a suitable composition, particle size, pore size, cage size and cage structure suitable for adsorbing a VOC (including, e.g., ammonia) producing during the process of coating the substrate with the resin of the resin-coated substrate. For example, in some embodiments, the zeolite may have an average particle size of about 1 micron to about 10 microns. In some embodiments, the zeolite may have an average particle size of about 1 micron to about 8 microns, or about 1 micron to about 6 microns. In some embodiments, the zeolite may have an average particle size of about 3 microns to about 5 microns.

In some embodiments, the zeolite may have an average pore size of about 2 Å to about 14 Å. In some embodiments, for example, the zeolite may have an average pore size of about 3 Å to about 10 Å, or about 3 Å to about 12 Å. In some embodiments, the zeolite may have an average pore size of about 4 Å to about 10 Å, for example about 4 Å to about 8 Å, or about 4 Å to about 6 Å. In some embodiments, the zeolite may have an average pore size of about 6 Å to about 10 Å.

In some embodiments, the resin-coated substrate may include a reaction product of a substrate, a polymer resin, a cross-linking agent, and optionally a compatibilizing agent. In some embodiments, a foundry sand may include the resin-coated substrate. In some embodiments, a proppant may include the resin-coated substrate.

In some embodiments, the polymer resin may include a phenolic resin, a novolac resin, a resole resin, a urea-formaldehyde resin, or a combination thereof. In some embodiments, for example, the polymer resin may include a phenolic resin or a novolac resin. In some embodiments, the polymer resin may include a novolac resin.

In some embodiments, the cross-linking agent may include hexamethylene tetramine.

In some embodiments, the compatibilizing agent may be a coupling agent, such as, e.g., a silane coupling agent.

In some embodiments, the composition may further include an odor control agent, such as, e.g., an odor masking agent or an odor neutralizing agent. In some embodiments, the odor control agent may include the ECOSORB® line of odor control additives (available from OMI Industries, Long Grove, Ill.), vanillin, C1-C20 esters, acidic compounds, acidic resins, ion-exchange resins, adsorbent resins, and/or activated charcoal. In some embodiments, the odor control agent may include an ECOSORB® additive and/or vanillin. Additionally, in some embodiments, the odor control agent may include the Lemon QuikAir product line (e.g., Lemon QuikAir, LemonQuikAir 1, Lemon QuikAir 2 and Lemon QuikAir 3), the QuickSoil Product line (e.g., QuickSoil 2300, QuickSoil 2400 and QuickSoil 2800), GOC 901 MC, GOC 501 MC and QuikAir 900, all of which available from GOC Technologies, Inc. (East Sussex, United Kingdom). Some additional nonlimiting examples of suitable odor control agents include citric acid, amyl acetate, α-amylcinnamaldehyde, linalyl acetate, 5-methylfurfural and 2-ethylhexanal.

According to some embodiments of the present invention, a method of preparing the resin-coated substrate includes mixing a substrate (e.g., a particulate substrate), a polymer resin, a cross-linking agent, a zeolite, and optionally a compatibilizing agent. In some embodiments, for example, the method may include heating the substrate, and adding the heated substrate to the polymer resin to provide a substrate-resin mixture. The heating may include heating the substrate to about 270° F. to about 350° F. In some embodiments, the method further includes adding the cross-linking agent to the substrate-resin mixture and continuing to heat the mixture to provide a pre-cured resin-coated substrate. In some embodiments, the method further includes quenching the reaction of the substrate-resin mixture and the cross-linking agent by adding quench water. The addition of quench water halts the curing/cross-linking reactions to form a pre-cured resin-coated substrate, which may be further cured/cross-linked by the end user. In some embodiments, the additive may be added to the pre-cured resin-coated substrate after the addition of the cross-linking agent and the water quench, which enables the additive to more effectively remove, or reduce the amount of, VOCs, including, e.g., the odor caused by the production of ammonia, formaldehyde and/or phenol during the subsequent curing/cross-linking reactions performed at an end user's facility.

In embodiments in which a compatibilizing agent is used, the method may further include adding the compatibilizing agent to the heated substrate to provide a treated substrate including the reaction product of components including the substrate and the compatibilizing agent. The heating may include heating the substrate to about 270° F. to about 350° F. Then, the polymer resin may be added to the treated substrate, while continuing to heat, to provide the substrate-resin mixture. The cross-linking agent may then be added to the substrate-resin mixture, while continuing to heat, to provide the pre-cured resin-coated substrate (i.e., the reaction product of components including the substrate, the compatibilizing agent, the polymer resin, and the cross-linking agent). In some embodiments, the method further includes quenching the reaction of the substrate-resin mixture and the cross-linking agent by adding quench water. The addition of quench water halts the curing/cross-linking reactions to form a pre-cured resin-coated substrate, which may be further cured/cross-linked by the end user. In some embodiments, the additive may be added to the pre-cured resin-coated substrate after the addition of the cross-linking agent and the water quench, which enables the additive to more effectively remove, or reduce the amount of, VOCs, including, e.g., the odor caused by the production of ammonia, formaldehyde and/or phenol during the subsequent curing/cross-linking reactions performed at an end user's facility.

In some embodiments, the method may further include adding an odor control agent, e.g., an odor masking agent and/or odor neutralizing agent. For example, the odor control agent may be added together with the additive or sequentially in any order (i.e., either before or after the addition of the additive) to the pre-cured resin-coated substrate. In some embodiments, the odor control agent may include any of the products in the ECOSORB® line of products available from OMI Industries (Long Grove, Ill.), vanillin, a C1-C20 ester, an acidic compound, an acidic resin, an ion-exchange resin, an adsorbent resin, and/or activated charcoal. For example, in some embodiments, the odor control agent may include an ECOSORB® product and/or vanillin. In some embodiments, the odor control agent may include an ECOSORB® additive and/or vanillin. Additionally, in some embodiments, the odor control agent may include the Lemon QuikAir product line (e.g., Lemon QuikAir, LemonQuikAir 1, Lemon QuikAir 2 and Lemon QuikAir 3), the QuickSoil Product line (e.g., QuickSoil 2300, QuickSoil 2400 and QuickSoil 2800), GOC 901 MC, GOC 501 MC and QuikAir 900, all of which available from GOC Technologies, Inc. (East Sussex, United Kingdom). Some additional nonlimiting examples of suitable odor control agents include citric acid, amyl acetate, α-amylcinnamaldehyde, linalyl acetate, 5-methylfurfural and 2-ethylhexanal.

In some embodiments, the method may further include the addition of a mold release agent. In some embodiments, the mold release agent may be a wax, a silicon-based compound, or a surfactant (such as, e.g., calcium stearate). In some embodiments, for example, the mold release agent may include a surfactant, such as, e.g., calcium stearate. The mold release agent may be added to the pre-cured resin-coated substrate. For example, the mold release agent may be added after the addition of all other components, including the additive and the odor control agent (if used). Alternatively, the mold release agent may be added together with the additive or the odor control agent. In some embodiments, for example, the mold release agent, additive and odor control agent are added together. In other embodiments, however, the mold release agent, additive and odor control agent are added in sequence, and can be added in any order. For example, in some embodiments, the additive and odor control agent can be added either together min any order to the pre-cured resin-coated substrate, and the mold release agent may be added together with the additive and odor control agent, or before or after the addition of the additive and/or odor control agent. However, in some embodiments, the mold release agent is added as the last ingredient, i.e., added to the pre-cured resin-coated substrate after the addition of all of the components and near the end of the method.

DETAILED DESCRIPTION

The reduction of odors, and VOC (volatile organic compound) and SVOC (semi-volatile organic compound) emissions from foundries and/or other manufacturing facilities is becoming increasingly important as emission guidelines and environmental regulations become stricter. While certain lower resin-content sands have been proposed in attempt to accomplish such reductions, decreasing the resin content on the particulate substrate can adversely impact the physical and mechanical properties of the resin-coated substrate (e.g., tensile, flexural, impact and compressive strengths). As such, alternative methods of reducing VOC and SVOC emissions, as well as reducing the odors produced during the process of coating the substrate are desirable. According to embodiments of the present invention, an additive is provided in the resin coated substrate system that mitigates or substantially eliminates the odors produced during the coating process, and/or reduces the amount of VOC and SVOC emissions from the coating process. In some embodiments, the additive includes bentonite and/or a zeolite. Zeolites have the ability to adsorb compounds of a size smaller than the zeolite pore size (or cage size), and therefore can be used to trap volatile compounds and/or odor compounds (e.g., ammonia) that are smaller than their cage size (or pore size). However, due to their differing physical structure and chemical constitution, the addition of zeolites would generally be expected to adversely affect the mechanical properties of a particulate substrate because they can absorb reactant monomers. However, according to embodiments of the present invention, an additive (e.g., bentonite or a zeolite) is added to a resin-coated particulate substrate composition (or system) while maintaining the ability of the resin-coated substrate system (with the additive) to function in applications requiring high mechanical strength (such as, e.g., foundry sand and proppant applications).

According to embodiments of the present disclosure, a resin-coated substrate composition includes a resin-coated substrate and an additive. The additive may serve to mitigate noxious odors produced during the resin coating process, and may also adsorb and remove (or reduce) odors produced during use of the resin-coated sands (such as, for example, odors produced in a foundry where the resin-coated substrate composition may be used). Additionally or alternatively, the additive may serve to remove (or reduce the amount of) VOCs and/or SVOCs produced during the resin coating process, and may also adsorb and remove (or reduce or substantially reduce) VOCs and/or SVOCs produced during use of the resin-coated substrate composition (such as, for example, VOCs and/or SVOCs produced in a foundry where the resin-coated substrate composition may be used).

In some embodiments, the additive is capable of adsorbing volatile compounds (e.g., ammonia and VOCs, such as formaldehyde) and semi-volatile compounds (e.g., SVOCs, such as phenols) in order to reduce the emission of these compounds. Throughout the present disclosure, "volatile compounds" is used interchangeable with "VOCs," "semi-volatile compounds" is used interchangeable with "SVOCs," and VOCs and SVOCs may be collectively referred to as "volatile components."

According to embodiments, the additive may be added to a pre-cured resin-coated substrate. When added to the pre-cured resin coated substrate, the additive can adsorb odorous components and volatile components to thereby reduce the emission of those components. The presence of odorous components and/or volatile components in the resin-coated substrate composition and may result from the process used to prepare the resin-coated substrate, for example, the process used to coat a particulate substrate with a resin in order to prepare the resin-coated substrate. For example, the reaction of the starting materials that are used to coat the particulate substrate with a resin may produce odorous components (such as, e.g., ammonia) and volatile components (such as, e.g., phenol and formaldehyde) that may be emitted during and/or after the resin coating reaction.

In some embodiments, the resin-coated substrate may include a reaction product of components including a substrate, a polymer resin, a cross-linking agent, and optionally a compatibilizing agent. For example, in some embodiments, the resin-coated substrate may include a reaction product of components including a substrate and polymer resin, with or without a separate cross-linking agent or compatibilizing agent. In some embodiments, for example, the resin-coated substrate may include a reaction product of components including a substrate, a polymer resin, and a cross-linking agent, without or without a compatibilizing agent. In some embodiments, the resin-coated substrate may include a reaction product of components including a substrate, a polymer resin, a cross-linking agent, and a compatibilizing agent.

The substrate may include any suitable particulate substrate, such as for example, sand, or silica-based sand. Non-limiting examples of suitable particulate substrates include silica sand, zircon sand, olivine sand, lake sand, chromite sand, talc sand, and quartz sand.

The substrate may be present in the composition in any amount relative to the other components so long as the amounts of the substrate and polymer resin are suitable to substantially coat the substrate with the polymer resin. For example, in some embodiments, the substrate may be present in the composition in an amount of about 88 wt % to about 99 wt %, for example, about 92 wt % to about 98 wt %, or about 94 wt % to about 97 wt %.

The polymer resin may be any suitable polymer resin capable of coating the particulate substrate. Non-limiting examples of the polymer resin include phenolic, novolac, resole, and urea-formaldehyde resins. In some embodiments, for example, the polymer resin may include a phenolic, a resole and/or a novolac resin. For example, in some embodiments, the polymer resin may include a novolac resin. The polymer resin may be present in the composition in any amount suitable to substantially coat the substrate. For example, in some embodiments, the polymer resin may be present in the composition in an amount of about 1 to about 4 wt % of the composition. In some embodiments, for example, the polymer resin may be present in the composition in an amount of about 1 to about 3 wt %, or about 1.5 to about 2.5 wt %.

The cross-linking agent may be any suitable cross-linking agent capable of facilitating or increasing the cross-linking of the polymer resin. Non-limiting examples of the cross-linking agent include multifunctional amines, such as, for example, hexamethylene tetramine. In some embodiments, however, a separate cross-linking agent can be omitted, and an opposite excess reactive polymer can serve as a cross-linking agent (e.g., by activation with heat). The cross-linking agent may be present in the composition in any amount suitable to effect cross-linking of the polymer resin, and to achieve a desired molecular weight. For example, in some embodiments, the cross-linking agent may be present in the composition in an amount of about 0.1 wt % to about 0.5 wt %. In some embodiments, for example, the cross-linking agent may be present in the composition in an amount of about 0.1 wt % to about 0.4 wt %, about 0.2 wt % to about 0.4 wt %.

The compatibilizing agent may be any suitable compound capable of improving compatibility of the substrate and the polymer resin. For example, in some embodiments, the compatibilizing agent may include any suitable coupling agent, such as, for example, a silane coupling agent. The silane coupling agent may be a multi-functional compound with at least one functional group capable of bonding to the surface of the silica particle, and at least one other functional group capable of cross-linking with the polymer resin. In some embodiments, for example, the silane coupling agent may include a compound represented by Formula 1.

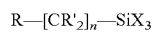

Formula 1

In Formula 1, R is a functionalized organic group, R' is H or a C1 to C5 alkyl group, n is an integer of 1 to 10, and X is a hydrolyzable group (e.g., a hydroxy group, or an alkoxy group). In Formula 1, geminal and vicinal R' groups may be the same or different. The functionalized organic group may include an organic group that includes a functional group capable of cross linking with the polymer resin. According to some embodiments, the organic group may include a functionalized alkyl or cycloalkyl group in which the functional group may include an amino group, a nitrogen-containing group, an epoxy group, a hydroxy group, or other suitable functional groups capable of reacting with the resin. The functional group may be selected based on the particular polymer resin. For example, for resole, novolac or phenolic resins, the functional group may be an amino group, an epoxy group, or other suitable functional groups capable of reacting with the resin. As a further example, for urea-formaldehyde resins, the functional group may include a nitrogen-containing group, a hydroxy group, or other suitable functional groups capable of reacting with the resin.

Non-limiting examples of suitable silane coupling agents include bis(2-hydroxyethyl)-3-amino-propyltriethoxysilane, 3-aminopropyl-triethoxysilane, 3-ureidopropyltriethoxysilane, N-(2-amino-ethyl)-3-aminopropyltrimethoxysilane, 3-aminopropyl-triethoxysilane, tri-methoxysilylpropyl-di-ethylenetriamine, 2-(3,4-epoxycyclohexyl)ethyltri-methoxysilane, and 3-glycidoxypropyltri-methoxysilane.

The compatibilizing agent may be present in the composition in any suitable amount, taking into consideration the desired amount of cross-linking and the desired final molecular weight of the polymer resin. According to some embodiments, for example, the compatibilizing agent may be present in the composition in an amount of about 0.05 wt % to about 0.2 wt % based on the total weight of system (including the substrate, the polymer resin, the cross-linking agent (if used) and the compatibilizing agent).

In some embodiments, the resin-coated substrate composition may include certain volatile components (e.g., phenols, ammonia, and formaldehyde) that remain after the reaction, or are generated during the curing reaction of the resin coating on the substrate. Such volatile components may be emitted from the resin-coated substrate during use of the resin-coated substrate. However, according to embodiments of the present disclosure, the addition of a suitable additive (e.g., bentonite or a suitable zeolite (e.g., a zeolite having a particle size and pore size suitable to trap the target volatile component)) to the resin-coated substrate in a pre-cured state (i.e., a pre-cured resin-coated substrate) reduces emission of the volatile components while not significantly affecting the mechanical properties of the resin-coated substrate.

In some embodiments, the additive may include bentonite or a zeolite. In some embodiments, for example, the additive may include bentonite clay. In some embodiments, the additive may include a zeolite. The zeolite may be any zeolite having a suitable composition, particle size, pore size (or cage size) and cage (or pore) structure suitable for adsorbing a volatile component (including, e.g., ammonia, phenol and/or formaldehyde) that may be produced during the process of coating the substrate with the resin of the resin-coated substrate, or emitted during use of the resin-coated substrate.

Any suitable bentonite clay may be used as the additive. For example, in some embodiments, about 50% to about 90% of the particles in the bentonite clay may have a particle size of about 200 mesh or less. In some embodiments, for example, about 60% to about 80%, about 60% to about 70%, or about 65% to about 68% of the particles in the bentonite clay may have a particle size of about 200 mesh or less. For example, in some embodiments, about 65% or about 67.5% of the particles in the bentonite clay may have a particle size of about 200 mesh or less. In some embodiments, for example, about 50% to about 90%, about 60% to about 80%, about 60% to about 70%, about 65% to about 68%, about 65%, or about 67.5% of the particles in the bentonite clay may have a particle size of about 100 mesh to about 200 mesh, or about 150 mesh to about 200 mesh. Bentonite clays having particle sizes within these ranges may be uniformly distributed throughout the composition, and may thus be more effective in adsorbing volatile components and reducing emission of those volatile components.

Also, any suitable zeolite may be used as the additive. The zeolite may have any suitable average particle size. For example, in some embodiments, the zeolite may have an average particle size of about 1 micron to about 10 microns. In embodiments, the zeolite may have an average particle size of about 1 micron to about 8 microns, or about 1 micron to about 6 microns. In some embodiments, the zeolite may have an average particle size of about 2 microns to about 6 microns, or about 3 microns to about 5 microns, Zeolites having particle sizes within these ranges may be uniformly distributed throughout the composition, and may thus be more effective in adsorbing volatile components and reducing emission of those volatile components.

The zeolite may have any pore size suitable to adsorb (or trap) the target volatile component (such as, e.g., ammonia, phenol and/or formaldehyde) without adsorbing (or trapping) larger molecules. In some embodiments, the zeolite pore size may be selected based on the effective radius (or approximate effective radius) of a target volatile component. For example, if a cross-linking agent such as hexamethylenetetramine is used in the manufacture of the resin-coated substrate, the production of ammonia is expected. In this example, as ammonia has an effective radius of about 3.6 Å, a suitable zeolite may include a zeolite having a pore size of greater than about 3.6 Å (e.g., a pore size of about 4 Å). According to embodiments of the present disclosure, therefore, the pore size of the zeolite may be larger than the effective radius of the component to be adsorbed. In some embodiments, for example, the pore size of the zeolite may be selected such that the zeolite has a pore size that is suitable to adsorb the target volatile component without adsorbing molecules with an effective radius (or approximate effective radius) which exceeds that of the zeolite pore size. That is, the zeolite pore size may be selected such that target components are adsorbed by the zeolite (i.e., based on their size), while other components are excluded from adsorption by the zeolite.

In some embodiments, for example, the zeolite may have an average pore size of about 2 Å to about 14 Å. In some embodiments, for example, the zeolite may have an average pore size of about 3 Å to about 10 Å, or about 3 Å to about 12 Å. In some embodiments, the zeolite may have an average pore size of about 4 Å to about 10 Å, for example about 4 Å to about 8 Å, or about 4 Å to about 6 Å. In some embodiments, the zeolite may have an average pore size of about 6 Å to about 10 Å.

In some embodiments, the resin-coated substrate composition may include more than one kind of additive, including, for example, more than one kind of zeolite. For example, in some embodiments, the resin-coated substrate composition may include an additive that includes both bentonite and a zeolite, or bentonite and one or more zeolites. In some embodiments, the additive may include two or more different zeolites. Indeed, the additive may include any number of different additive types, e.g., any combination of bentonite with any number of zeolites, or any number of different zeolites. In some embodiments, the resin-coated substrate composition may include two or more zeolites, each having a different structure (e.g., a different pore size). With such a combination of different additives (e.g., different zeolites), the additive can be tailored to adsorb different volatile or odorous components that are expected to be produced based on the other components of the composition or on the expected use of the composition after manufacture. As such, in some embodiments, the resin-coated substrate composition may include two or more additives, each selected to adsorb a different volatile or odorous component. For example, if ammonia and phenol are expected to be produced (either during manufacture of the composition or during use of the composition), the resin-coated substrate composition may include a first additive selected to adsorb ammonia (e.g., either a zeolite having a pore size of about 5 Å or greater, or bentonite to adsorb the ammonia), and a second additive to adsorb the phenol (e.g., either a zeolite having a pore size of about 10 Å or greater, or bentonite to adsorb the phenol).

The resin-coated substrate composition may include any suitable amount of the additive so long as the addition of the additive does not significantly alter the mechanical performance of the composition. In some embodiments, for example, the additive may be present in the resin-coated substrate composition in amount of about 0.03 wt % to about 0.5 wt % based on the weight of the resin-coated substrate. In some embodiments, for example, the additive may be present in an amount of about 0.035 wt % to about 0.3 wt %, about 0.035 wt % to about 0.25 wt %, or about 0.035 wt % to about 0.2 wt % based on the total weight of the resin-coated substrate. For example, in some embodiments, the additive may be present in an amount of 0.035 wt %, about 0.05 wt %, about 0.1 wt %, about 0.15 wt %, about 0.2 wt %, or about 0.025 wt % based on the total weight of the resin-coated substrate. In some embodiments, for example, the additive may be present in an amount of about 0.22 wt % based on a total weight of the resin-coated substrate. When the additive is present in the resin-coated substrate composition in an amount within any of these ranges, the additive may effectively reduce odors or volatile components emitted during manufacture or during use without significantly altering the mechanical properties of the composition. When the additive is present in the resin-coated composition an amount below about 0.035%, the additive may be less effective in reducing the emission of odorous and volatile components.

In some embodiments, the resin-coated substrate composition may further include an odor control agent. The odor control agent may be any suitable component capable of masking or neutralizing odors produced during the manufacture or use of the resin-coated substrate composition. For example, in some embodiments, the odor control agent may be any suitable odor masking agent and/or odor neutralizing agent. In some embodiments, the odor control agent may include a scented compound, such as vanillin and/or a C4-C30 ester such as benzyl acetate, butyl butyrate, butyl acetate, ethyl butyrate, ethyl cinnamate, or the like. In some embodiments, the odor control agent may include a compound capable of reacting with and/or interacting with the volatile or odorous components to form non-volatile and/or less odorous components. For example, in some embodiments, the odor control agent may include an acidic odor control agent that may react with, e.g., ammonia to form non-odorous or less odorous compounds, such as, e.g., ammonium chloride. As another example, the odor control agent may include an aldehyde that may react with, e.g., ammonia to form safer and less odorous compounds.

Additional examples of suitable odor control agents include any materials capable of adsorbing, absorbing, or otherwise forming a complex with volatile components to form non-volatile or less odorous components. Some non-limiting examples of suitable such odor control agents include the ECOSORB® line of products available from OMI Industries (Long Grove, Ill.), vanillin, esters, ion-exchange resins, adsorbent resins, activated charcoal, ammonia scavengers, and other scavengers selected based on the target volatile component to be scavenged. Non-limiting examples of suitable ammonia scavengers include acidic compounds, aldehyde compounds, ester compounds, acidic resins, ion-exchange resins, adsorbent resins, activated charcoal, sodium benzoate, zeolites suitable for adsorbing epoxy-sized molecules, glycerol, phenylbutyrate, sodium phenylbutyrate, zirconium phosphate, epsom salts, and formaldehyde solutions. While formaldehyde is also among the volatile components sought to be controlled or reduced, excess formaldehyde resins (e.g., resoles) may also serve as ammonia scavengers without substantially increasing the formaldehyde emission of the resin-coated substrate.

Some additional examples of suitable odor control agents include the Lemon QuikAir product line (e.g., Lemon QuikAir, LemonQuikAir 1, Lemon QuikAir 2 and Lemon QuikAir 3), the QuickSoil Product line (e.g., QuickSoil 2300, QuickSoil 2400 and QuickSoil 2800), GOC 901 MC, GOC 501 MC and QuikAir 900, all of which are available from GOC Technologies, Inc. (East Sussex, United Kingdom). Some additional nonlimiting examples of suitable odor control agents include citric acid, amyl acetate, a-amylcinnamaldehyde, linalyl acetate, 5-methylfurfural and 2-ethylhexanal.

The odor control agent may be present in the composition in any suitable amount. For example, in some embodiments, the odor control agent may be present in the composition in an amount of about 0.05 wt % to about 0.5 wt %. In some embodiments, for example, the odor control agent may be present in the composition in an amount of about 0.05 wt % to about 0.3 wt %, about 0.03 wt % to about 0.3 wt %, or about 0.03 wt % to about 0.2 wt %. For example, in some embodiments, the additive may be present in an amount of 0.1 wt % to about 0.3 wt %, about 0.1 wt % to about 0.2 wt %, about 0.15 wt % to about 0.2 wt %, or about 0.15 wt %.

In some embodiments, the resin-coated substrate composition may further include an anti-veining agent. The anti-veining agent may include any compound suitable for reducing veining defects in a metal, which may occur due to expansion of the substrate which results in the formation of cracks in the substrate during metal casting. Non-limiting examples of suitable anti-veining agents include glass-based compounds, mineral-based compounds, iron oxide-based compounds, and other compounds commonly used in foundry sands for their anti-veining properties. Specific non-limiting examples of suitable anti-veining additives include black iron oxide, and VEINO ULTRA RS2® available from ASK Chemicals LP (Dublin, Ohio).

The anti-veining agent may be present in the composition in any suitable amount. For example, in some embodiments, when used, the anti-veining agent may be present in the composition in an amount of about 5 wt % or less. In some embodiments, for example, anti-veining agent may be present in the composition in an amount of about 0.5 wt % to about 4 wt %, about 1 wt % to about 4 wt %, or about 3 wt % to about 4 wt %.

In some embodiments, the resin-coated substrate composition may further include a mold release agent. For example, in embodiments in which the resin-coated substrate composition is used in foundry sands, a mold release agent may be included in the resin-coated substrate composition in order to facilitate release of a molded form from a metal cast mold as well as to improve fluidity of the resin-coated substrate. Non-limiting examples of suitable mold release agents include calcium stearate, zinc stearate, ethylene bis-stearyl amide, methylene stearyl amide, oxystearyl amide, stearyl amide, polyethylene wax, carnauba wax, Montan wax, paraffin wax, polyethylene wax, silicone compounds, and linoleyl amide. In some embodiments, for example, the mold-release agent may include a surfactant, such as, for example, calcium stearate.

The mold release agent may be present in the composition in any suitable amount. For example, in some embodiments, the mold release agent may be present in the composition in an amount of about 0.01 wt % to about 0.25 wt %. In some embodiments, for example, the mold release agent may be present in the composition in an amount of about 0.02 wt % to about 0.15 wt %, about 0.02 wt % to about 0.08 wt %, about 0.03 wt % to about 0.07 wt %, or about 0.04 wt % to about 0.06 wt %.

In some embodiments, the resin-coated substrate composition may further include a cross-linking agent. The cross-linking agent may be any suitable compound for facilitating or improving cross-linking of the polymer resin. In some embodiments, for example, the cross-linking agent may be any multifunctional compound capable of forming cross-links with the polymer resin. As would be understood by those of ordinary skill in the art, the selection of a suitable cross-linking agent will depend on the polymer resin used in the system, and selection of an appropriate cross-linking agent for a particular polymer resin is within the skill of the ordinary artisan. Nevertheless, some non-limiting examples of suitable cross-linking agents include diamines (e.g., for phenolic, novolac, and resole resins), phenols (e.g., for phenolic, novolac, and resole resins), and acidic or acid-forming compounds (e.g., for urea-formaldehyde resins).

As discussed above, the cross-linking agent may be present in the composition in any amount suitable to effect cross-linking of the polymer resin, and to achieve a desired molecular weight. For example, in some embodiments, the cross-linking agent may be present in the composition in an amount of about 0.1 wt % to about 0.5 wt %. In some embodiments, for example, the cross-linking agent may be present in the composition in an amount of about 0.1 wt % to about 0.4 wt %, about 0.2 wt % to about 0.4 wt %.

In some embodiments, the resin-coated substrate composition may further include a compatibilizing agent. The compatibilizing agent may serve to more firmly bond the polymer resin to the substrate (e.g., by providing an increased number of cross-links between the resin and the substrate). Any suitable compatibilizing agent capable of improving compatibility (or binding) of the polymer resin with the substrate may be used. For example, in some embodiments, the compatibilizing agent may be any suitable coupling agent, such as, for example, a silane coupling agent. In some embodiments, the compatibilizing agent is present in the resin-coated substrate composition in an amount suitable to improve the binding of the resin to the substrate, and thereby improve the mechanical properties of the resin-coated substrate. In some embodiments, the amount of compatibilizing agent may be selected by balancing cost considerations with the curbing of increases in gas generation resulting from the compatibilizing agent during metal casting. According to some embodiments, for example, the compatibilizing agent is present in the composition in an amount of about 0.05 wt % to about 0.2 wt % based on the total weight of system (including the substrate, the polymer resin, the cross-linking agent (if used) and the compatibilizing agent).

In some embodiments, the resin-coated substrate composition including the additive may register a reduced ammonia emission of about 15 ppm or less, for example, about 13 ppm or less, about 12 ppm or less, about 11 ppm or less, or about 11 ppm. In some embodiments, the resin-coated substrate composition including the additive may register a reduced phenol emission of about 20 or less, for example, about 18 ppm or less, about 15 ppm or less, about 14 ppm or less, or about 13 ppm. In some embodiments, the resin-coated substrate composition including the additive may register a reduced formaldehyde emission of an amount which is undetectable by hot headspace GC-MS analysis. In some embodiments, the resin-coated substrate composition including the additive may register a reduced total volatile component (e.g., VOC and/or SVOC and/or odorous component) emission of less than about 100 ppm, for example, about 80 ppm or less, about 70 ppm or less, or about 60 ppm.

According to some embodiments, a method of preparing a resin-coated substrate composition may include mixing a substrate, a polymer resin and an additive to form a resin-coated substrate composition. The method may further include mixing a cross-linking agent and/or a compatibilizing agent with the substrate, polymer resin and additive. Additionally, the method may further include mixing an odor control agent, a mold release agent, and/or an anti-veining agent with the substrate, polymer resin and additive. In some embodiments, for example, the method may further include mixing an odor control agent, a mold release agent and/or an anti-veining agent with the substrate, the polymer resin, and the additive as well as the cross-linking agent and/or the compatibilizing agent. The polymer resin, cross-linking agent, additive, odor control agent, mold release agent, and anti-veining agent are the same as those described above with reference to the resin-coated substrate compositions.

In some embodiments, the substrate may be mixed with the polymer resin and optionally the cross-linking agent under conditions suitable to allow for coating of the substrate with the resin. For example, in some embodiments, the method includes heating the substrate to a temperature suitable to soften the polymer resin, and mixing the heated substrate with the polymer resin with continued heating to soften the resin and coat the softened resin on the substrate.

In some embodiments, the heating of the substrate includes heating the substrate to a temperature of about 270° F. to about 350° F. The substrate may then be transferred to a vessel (e.g., a muller mixing vessel). The polymer resin may be added to the heated substrate with mixing for about 50-200 seconds (e.g. about 100 seconds), followed by addition of the crosslinking agent (if using) with mixing for about 50-200 seconds (e.g. about 100 seconds). Water may be added to quench the reaction. An accelerant (e.g., salicylic acid) may be added prior to or after the water quench. The polymer resin may be added before the crosslinking agent is added, such that the polymer resin (e.g., polymer resin pastilles) may soften and pre-coat the substrate. According to some embodiments, water may be added about 50-200 seconds (e.g. about 100 seconds) after addition of the cross-linker to quench the resulting curing reaction. The length of time for each step may vary according to the temperature, the type of polymer resin, the type of cross-linking agent, and the type of substrate used to form the resin-coated substrate composition.

As discussed generally above, the additive may be introduced after the aqueous quench. In some embodiments, the accelerant (e.g., salicylic acid) may be added together with or after the addition of quench water and before the addition of the additive.

In some embodiments, the method may further include introduction of a mold release agent (such as a surfactant, e.g. calcium stearate) and/or an odor control agent. According to some embodiments, the additive, odor control agent, and/or mold release agent are all added after the water quench. The additive, mold release agent, and/or odor control agent may be added concurrently or sequentially in any order. The mold-release agent, additive and odor control agent are same as described above with reference to the resin-coated substrate composition.

The following Examples are presented for illustrative purposes only, and do not limit the scope of any of the embodiments of the present invention.

EXAMPLES

In the examples, LOI ("loss on ignition") is obtained by heating a material to a high temperature (>1200° F.) in an oxygen-containing atmosphere until the mass of the material remains constant. The reported LOI values were determined after heating to a temperature of 1200° F. The LOI value represents the total level of organic materials in the mixture. LOI is not a direct measure of odor reduction effectiveness because many foundries judge VOC levels at the core or shell formation step (through their individual smells), which is performed at a lower temperature. While lower LOI resins are generally less odorous due to fewer organic materials present, the LOI value does not provide a good predictor of performance criteria. Accordingly, in order to more directly measure the level of emissions, GC-MS head space analysis was performed. The GC-MS headspace analysis was performed at a temperature of about 190° C., which is often the uppermost limit for existing headspace technology and overlaps the lower temperature range at which foundry materials are used.

The following Comparative Examples 1 to 3 (shown in Tables 1 to 3) show three control resin-coated sand compositions, each having a different LOI, and each of which includes a substrate (Ottawa F75 which is a silica-based sand, available from US Silica, Frederick, Md.), a novolac resin (Plenco 14995 provided as novolac beads, available from Plastics Engineering Company, Sheboygan, Wis.), a hexamethylene tetramine cross-linking agent (Plenco 14289, available from Plastics Engineering Company, Sheboygan, Wis.), salicylic acid as an accelerant, and calcium stearate as a mold release agent. Comparative Examples 1 to 3 are used as controls, and they do not include an additive for reducing odorous or volatile component emissions.

Comparative Example 1

2% LOI Control

As shown in the below Table 1, 1000 g of a silica-based sand substrate (Ottawa F75, available from US Silica, Frederick, Md.) was heated to a temperature of 240° C., and then transferred to a vessel. To the vessel, 17.6 g of novolac beads (Plenco 14995, available from Plastics Engineering Company, Sheboygan, Wis.) were added and mixed with the substrate for about 70 seconds. Then 5.6 g of a 40% solution of hexamethylene tetramine (Plenco 14289, available from Plastics Engineering Company, Sheboygan, Wis.) was added the vessel with mixing for 15 seconds. 6 g of water was then added with mixing for 10 seconds to quench the reaction. Then, 0.7 g of salicyclic acid (as an accelerant) and 0.5 g of calcium stearate (as a mold release agent) were added to the vessel to complete the additive-free resin-coated substrate composition.

TABLE 1

| Material | Amount (grams) | ΔTime (secs) | Comments |
| --- | --- | --- | --- |
| Ottawa F75 Silica | 1000 | 0 | Heat to 240° C./Transfer quickly |
| Plenco 14995 Novalac Beads | 17.6 | 30 | Hold until 100 seconds |
| Plenco 14289 Hexa | 5.6 | 100 | 40% Solution (2.24) |
| Quench Water | 6 | 115 | |
| Salicylic acid | 0.7 | 125 | added by hand |
| Calcium Stearate | 0.5 | 125 | added by hand |

Comparative Example 2

2.25% Control

As shown in the below Table 2, 1000 g of a silica-based sand substrate (Ottawa F75, available from US Silica, Frederick, Md.) was heated to a temperature of 400° F., and then transferred to a vessel. To the vessel, 19.6 g of novalac beads (Plenco 14995, available from Plastics Engineering Company, Sheboygan, Wis.) were added and mixed with the substrate for about 70 seconds. Then 7.3 g of a 40% solution of hexamethylene tetramine (Plenco 14289, available from Plastics Engineering Company, Sheboygan, Wis.) was added the vessel with mixing for 15 seconds. 6 grams of water was then added with mixing for 10 seconds to quench the reaction. Then 0.8 g of salicyclic acid (as an accelerant) and 0.5 g of calcium stearate (as a mold release agent) were added to the vessel to complete the additive-free resin-coated substrate composition.

TABLE 2

| Material | Amount (grams) | ΔTime (secs) | Comments |
| --- | --- | --- | --- |
| Ottawa F75 Silica | 1000 | 0 | Heat to 400° F./Transfer quickly |
| Plenco 14995 Novalac Beads | 19.6 | 30 | Hold until 100 seconds |
| Plenco 14289 Hexa | 7.3 | 100 | 40% Solution (2.93) |
| Quench Water | 6 | 115 | |
| Salicylic acid | 0.8 | 125 | added by hand |
| Calcium Stearate | 0.5 | 125 | added by hand |

Comparative Example 3

2.5% LOI Control

As shown in the below Table 3, 1000 g of a silica-based sand substrate (Ottawa F75, available from US Silica, Frederick, Md.) was heated to a temperature of 400° F., and then transferred to a vessel. To the vessel, 22.3 g of novalac beads (Plenco 14995, available from Plastics Engineering Company, Sheboygan, Wis.) were added and mixed with the substrate for about 70 seconds. Then 8.33 g of a 40% solution of hexamethylene tetramine (Plenco 14289, available from Plastics Engineering Company, Sheboygan, Wis.) was added the vessel with mixing for 15 seconds. 6 grams of water was then added with mixing for 10 seconds to quench the reaction. Then 0.9 g of salicyclic acid (as an accelerant) and 0.5 g of calcium stearate (as a mold release agent) were added to the vessel to complete the additive-free resin-coated substrate composition.

TABLE 3

| Material | Amount (grams) | ΔTime (secs) | Comments |
|---|---|---|---|
| Ottawa F75 Silica | 1000 | 0 | Heat to 400° F./Transfer quickly |
| Plenco 14995 Novalac Beads | 22.3 | 30 | Hold until 100 seconds |
| Plenco 14289 Hexa | 8.33 | 100 | 40% Solution (3.33) |
| Quench Water | 6 | 115 | |
| Salicylic acid | 0.9 | 125 | added by hand |
| Calcium Stearate | 0.5 | 125 | added by hand |

The following Examples 4 to 6 (shown in Tables 4 to 6) include compositions manufactured as in Example 2, except that varying amounts of ADVERA© 401 P zeolite (available from The PQ Corporation, Valley Forge, Pa.).

Example 1

2.25% LOI Control with 0.1% of Resin Zeolite (Advera 401P)

As shown in the below Table 4, a resin-coated sand composition was manufactured as in Example 2 above, except that 0.025 g of ADVERA© 401 P zeolite (available from The PQ Corporation, Valley Forge, Pa.) was added along with the salicylic acid and calcium stearate.

TABLE 4

| Material | Amount (grams) | ΔTime (secs) | Comments |
|---|---|---|---|
| Ottawa F75 Silica | 1000 | 0 | Heat to 400° F./Transfer quickly |
| Plenco 14995 Novalac Beads | 19.6 | 30 | Hold until 100 seconds |
| Plenco 14289 Hexa | 7.3 | 100 | 40% Solution (2.93) |
| Quench Water | 6 | 115 | |
| Salicylic acid | 0.8 | 125 | added by hand |
| ADVERA © 401 P Zeolite | 0.25 | 125 | Add in with Ca-Stearate |
| Calcium Stearate | 0.5 | 125 | added by hand |

Example 2

2.25% LOI Control with 0.2% of Resin Zeolite (Advera 401P)

As shown in the below Table 5, a resin-coated sand composition was manufactured as in Example 2 above, except that 0.05 g of ADVERA© 401 P zeolite (available from The PQ Corporation, Valley Forge, Pa.) was added along with the salicylic acid and calcium stearate.

TABLE 5

| Material | Amount (grams) | ΔTime (secs) | Comments |
|---|---|---|---|
| Ottawa F75 Silica | 1000 | 0 | Heat to 400° F./Transfer quickly |
| Plenco 14995 Novalac Beads | 19.6 | 30 | Hold until 100 seconds |
| Plenco 14289 Hexa | 7.3 | 100 | 40% Solution (2.93) |
| Quench Water | 6 | 115 | |
| Salicylic acid | 0.8 | 125 | added by hand |
| ADVERA © 401 P Zeolite | 0.5 | 125 | Add in with Ca-Stearate |
| Calcium Stearate | 0.5 | 125 | added by hand |

Example 3

2.25% LOI Control with 0.4% of Resin Zeolite (Advera 401P)

As shown in the below Table 6, a resin-coated sand composition was manufactured as in Example 2 above, except that 0.1 g of ADVERA© 401 P zeolite (available from The PQ Corporation, Valley Forge, Pa.) was added along with the salicylic acid and calcium stearate.

TABLE 6

| Material | Amount (grams) | ΔTime (secs) | Comments |
|---|---|---|---|
| Ottawa F75 Silica | 1000 | 0 | Heat to 400° F./Transfer quickly |
| Plenco 14995 Novalac Beads | 19.6 | 30 | Hold until 100 seconds |
| Plenco 14289 Hexa | 7.3 | 100 | 40% Solution (2.93) |
| Quench Water | 6 | 115 | |
| Salicylic acid | 0.8 | 125 | added by hand |
| ADVERA © 401 P Zeolite | 0.1 | 125 | Add in with Ca-Stearate |
| Calcium Stearate | 0.5 | 125 | added by hand |

In Examples 1 to 3 and Comparative Examples 1 to 3, the % LOI is the total amount of organic matter upon exposure of the coated sand to a furnace set at 1200° F. The following Table 7 compares the mechanical performance of the resin-coated sand compositions of Comparative Examples 1 to 3 and the additive containing resin-coated sand compositions of Examples 1 to 3. Comparisons were made based on a least squares fit of the LOI data provided from the low, medium, and high LOI controls from Comparative Examples 1 to 3. As can be seen from these results, the mechanical performance of Examples 1 to 3 at least matched the predicted performance of Comparative Examples 1 to 3.

TABLE 7

Physical Property Results of Examples 1 to 3 and Comparative Examples 1 to 3.

| Example | Description | Stick Point | LOI | Actual Hot Tensile | Predicted Hot Tensile |
|---|---|---|---|---|---|
| Comp. 1 | Low LOI Control | 199 | 1.97 | 156 | 186.4324324 |
| Comp. 2 | Medium LOI Control | 201 | 2.24 | 269 | 215.7432432 |
| Comp. 3 | High LOI Control | 205 | 2.6 | 232 | 254.8243243 |
| Ex. 1 | low zeolite | 204 | 2.31 | 312 | 223.3423423 |
| Ex. 2 | medium zeolite | 204 | 2.21 | 214 | 212.4864865 |
| Ex. 3 | high zeolite | 203 | 2.25 | 270 | 216.8288288 |

The measurement of hot tensile strength was performed in accordance with industrial American Foundry Sand (AFS) procedures. Here, room temperature sand is scraped into a dog bone shape, preheated to 450° F. for a set period of time, and then the resulting heated dog bone is stretched at a constant elongation until its breaking point. Comparative Examples 1 to 3 were used to create a least squares fit which was then compared to Examples 1 to 3.

The following Examples 4-7 include formulations in which the zeolite concentration was varied to determine the concentration at which the additive might affect hot tensile performance. These experiments were run as a series of trial runs (Series 1 to 4). The effect of the zeolite concentration was evaluated by comparing a control (i.e., no zeolite) to samples having varying zeolite concentrations (i.e., zeolite concentrations of about 2 lbs., about 4 lbs., and about 6 lbs.).

Examples 4-7

Zeolite Series 1-4

As shown in Table 8 below, the compositions of Examples 1-4 were the same except for the amount of the Advera PZ zeolite (available from The PQ Corporation, Valley Forge, Pa.). As can be seen in Table 8, the amount of the zeolite was varied between 0 and 6 lbs. in Examples 4-7.

TABLE 8

Zeolite Formulas (Series 1-4).

| Ingredient (—) | Amount (lbs.) | LOI Contributor (lbs.) |
|---|---|---|
| Ottawa F75 | 2500 | 0 |
| Plenco 14995 | 48.5 | 48.5 |
| Plenco 14289 Hexa (40%) | 15.8 | 6.32 |
| Quench Water | 20 | 0 |
| Salicylic Acid | 2 | 2 |
| Advera PZ Zeolite | 0-6 | 0 |
| Calcium Stearate | 1.1 | 1.1 |
| TOTAL | ~2590 | ~2.24%* |

*The LOI is slightly less (2.23%) in later runs. See Table 13.

The parameters used in analyzing the above Series 1-4 (Examples 4-7) are shown in Table 9 below. In some of the trial runs performed early in each series, the resin coated materials were run hotter than the trial runs performed later in each series (i.e., as sequentially listed in the table). In later trial runs, the SSTs (sand set temperatures) were reduced. More quench water was employed in these later trial runs, which may have been due to the hotter exiting sand temperatures experienced during these trials runs. The exiting sand temperature was controlled to be below a minimum level of 190° F. to avoid later reactions that could plug up the system.

TABLE 9

Run Parameters for Examples 4-7

| Series (#) | Sack (#) | SST[1] (° F.) | SST Actual[1] (° F.) | EST[2] (° F.) | Quench Water (lbs) |
|---|---|---|---|---|---|
| 1 | 1 | 340 | | | 20 |
| 1 | 2 | 330 | 351 | 186 | |
| 1 | 3 | 320 | | 178 | 38 |
| 1 | 4 | 320 | 345 | 178 | |
| 1 | 5 | 315 | | | 46 |
| 2 | 6 | 330 | 343 | | 46 |
| 2 | 7 | 320 | | 195 | |
| 2 | 8 | 320 | | | 50 |
| 2 | 9 | 320 | | | |
| 2 | 10 | 310 | | 186 | 56 |
| 3 | 11 | 315 | 350 | | 56 |
| 3 | 12 | 305 | | 185 | |
| 3 | 13 | 305 | | | 60 |
| 3 | 14 | 305 | 339 | 175 | |
| 3 | 15 | 305 | | | 60 |
| 4 | 16 | 315 | | | 60 |
| 4 | 17 | 305 | 346 | 174 | |
| 4 | 18 | 295 | | 178 | 60 |
| 4 | 19 | 295 | 331 | | |
| 4 | 20 | 295 | | | 60 |

[1]SST = Sand Set Temperature set and measured (actual)
[2]EST = Exit Sand Temperature (temperature after first screen, i.e., after being heated in a mixing apparatus, but before cooling the mixing apparatus.)

The EST (exit sand temperature) was about 180° F., which is near the temperature at which particles of the resin-coated sand composition may stick to each other. Runs near the beginning of each series had lower hot tensile strengths, whereas runs near the end of each series had higher hot tensile strengths. This may be due to SST changes across each series.

Tables 10 and 11, below, list the individual properties and series averages, respectively. These tables appear to show a continuous decline in performance with the addition of increasing amounts of the zeolite. The SST reduction during the course of the trial also resulted in changes to tensile strength overall performance.

TABLE 10

Individual Performance Parameters for Examples 4-7

| Series (#) | Formulation (—) | Sack (#) | Stick Point (° F.) | Hot Tensile Strength (psi) | LOI (%) | SST* (° F.) |
|---|---|---|---|---|---|---|
| 1 | Control | 1 | 189 | 232 | 2.33 | 340 |
| 1 | Control | 2 | 191 | 214 | 2.27 | 330 |
| 1 | Control | 3 | 196 | 238 | 2.30 | 320 |
| 1 | Control | 4 | 194 | 218 | 2.31 | 320 |
| 1 | Control | 5 | 196 | 222 | 2.27 | 315 |
| 2 | 2 lb Advera PZ | 6 | 198 | 218 | 2.30 | 330 |
| 2 | 2 lb Advera PZ | 7 | 207 | 212 | 2.32 | 320 |
| 2 | 2 lb Advera PZ | 8 | 201 | 248 | 2.22 | 320 |
| 2 | 2 lb Advera PZ | 9 | 205 | 200 | 2.45 | 320 |
| 2 | 2 lb Advera PZ | 10 | 201 | 250 | 2.41 | 315 |
| 3 | 4 lb Advera PZ | 11 | 201 | 262 | 2.8 | 315 |
| 3 | 4 lb Advera PZ | 12 | 201 | 238 | 2.38 | 305 |
| 3 | 4 lb Advera PZ | 13 | 201 | 240 | 2.36 | 305 |
| 3 | 4 lb Advera PZ | 14 | 201 | 234 | 2.35 | 305 |
| 3 | 4 lb Advera PZ | 15 | 203 | 230 | 2.55 | 305 |
| 4 | 6 lb Advera PZ | 16 | 201 | 218 | 2.35 | 315 |
| 4 | 6 lb Advera PZ | 17 | 200 | 230 | 2.38 | 305 |
| 4 | 6 lb Advera PZ | 18 | 201 | 230 | 2.35 | 295 |
| 4 | 6 lb Advera PZ | 19 | 202 | 234 | 2.24 | 295 |
| 4 | 6 lb Advera PZ | 20 | 202 | 242 | 2.38 | 295 |

*SST = Sand Set Temperature
**The red iron oxide contains organic material; 0.6% was subtracted off the measured LOI.

TABLE 11

Summarized Property Results for Examples 4-7

| Series (#) | Description (—) | Stick Point** (° F.) | Hot Tensile Strength (psi) | LOI (%)* | SST (° F.) |
|---|---|---|---|---|---|
| 1 | Control | 193 ± 3 (5) | 225 ± 10 (5) | 2.30 ± 0.03 (5) | 325 |
| 2 | 2 lb Advera PZ | 202 ± 4 (5) | 226 ± 22 (5) | 2.34 ± 0.09 (5) | 320 |
| 3 | 4 lb Advera PZ | 201 ± 1 (5) | 241 ± 12 (5) | 2.49 ± 0.19 (5) | 307 |
| 4 | 6 lb Advera PZ | 201 ± 1 (5) | 231 ± 9 (5) | 2.34 ± 0.06 (5) | 321 |

*Numbers after the ± sign are the standard deviations, while the numbers in parenthesis refer to the number of runs performed for each series.
**As used herein, the term "stick point" is used as a more accurate term (i.e., more accurate than the term "melt point") for the temperature at which the resin becomes soft and sticks to the substrate.

Table 12, below, summarizes the efficacy of the zeolites in reducing emission of volatile components in the resin-coated sand compositions prepared according to the above Examples and Comparative Examples. As shown in Table 16, the addition of up to 6 lbs. of zeolite did not appear to significantly affect the tensile strength properties of the respective formulations.

Table 12 summarizes total emissions for the bolded samples in Table 10 (i.e., Sacks 3, 8, 11 and 19). The samples were analyzed using heated (to about 374° F., 190° C.) static headspace-Gas Chromatography/Mass Spectrometry (GC/

MS). Table 12 reports the amounts of ammonia (CAS 7664-41-7), formaldehyde (CAS 50-00-0), phenol (CAS 108-95-2), and the total amount of organic compounds detected in each sample.

TABLE 12

Compounds detected in the listed samples, reported as µg/gram or parts per million [ppm].

| Compounds Detected | Sack 3 (Control) | Sack 8 | Sack 11 | Sack 19 |
|---|---|---|---|---|
| Total Organics[1] | 111.121 | 106.099 | 121.842 | 79.477 |
| Ammonia | 13.525 | 12.798 | 14.015 | 11.679 |
| Formaldehyde | — | — | — | — |
| Phenol[2] | 16.451 | 13.276 | 14.730 | 13.112 |

[1]Reflects results from an integration of the entire baseline.
[2]Even though the compound was detected in the sample as a co-eluding mixture, the response for the mixture was included in this category.

Table 13, below, shows GC-MS headspace data and serves as a comparison of the emissions of various formulations.

TABLE 13

Comparison of efficacy of zeolite addition on reducing emissions of ammonia, formaldehyde, phenol, and total organics in various resin-coated sand formulations.

| Volatiles | Sack 9 (—) | Sack 14 (—) | Sack 3 (control) (—) | Sack 19 (—) |
|---|---|---|---|---|
| Ammonia | 15.2 | 13.7 | 13.5 | 11.7 |
| Formaldehyde | 0 | 0 | 0 | 0 |
| Phenol | 16.3 | 17.1 | 16.5 | 13.1 |
| Total Organics | 98 | 82.2 | 111 | 79.5 |
| Sack | 9 | 14 | 3 | 19 |
| Zeolite | 2 lbs | 4 lbs | 0 | 6 lbs |
| Hexa Level | 13% | 13% | 13% | 13% |

Table 13 shows that the resin-coated sand with 4 lbs. of added zeolite (Sack 14), and the resin-coated sand with 6 lbs. of added zeolite (Sack 19) had significantly lower total organics emission levels compared to that of the control.

The following Examples 8-10 included resin-coated sand compositions in which the additive was bentonite clay. The formulas for these Examples are shown in the following Tables 14-16.

Example 8

Bentonite Formula of Table 14

TABLE 14

| Ingredient | Amount (lbs.) | LOI Contributor (lbs.) |
|---|---|---|
| Ottawa F75 | 2500 | 0 |
| Plenco 14995 | 76.0 | 76.0 |
| Salicyclic Acid | 1.0 | 1.0 |
| Plenco 14289 (40%) | 26.0 | 10.4 |
| Quench Water | 20 | 0 |
| Salicylic Acid | 2.4 | 2.4 |
| Bentonite | 6.0 | 0 |
| Calcium Stearate | 1.7 | 1.7 |
| TOTAL | 2633.1 | 91.5 |
| TOTAL SANS WATER | 2597.5 | 3.52% |

Example 9

Bentonite Formula of Table 15

TABLE 15

| Ingredient (—) | Amount (lbs.) | LOI Contributor (lbs.) |
|---|---|---|
| Ottawa F75 | 2500 | 0 |
| Plenco 14995 | 76.0 | 76.0 |
| Salicyclic Acid | 1.5 | 1.5 |
| Plenco 14289 (40%) | 26.0 | 10.4 |
| Quench Water | 20 | 0 |
| Salicylic Acid | 1.9 | 1.9 |
| Bentonite | 6.0 | 0 |
| Calcium Stearate | 1.7 | 1.7 |
| TOTAL | 2633.1 | 91.5 |
| TOTAL SANS WATER | 2597.5 | 3.52% |

Example 10

Bentonite Formula of Table 16

TABLE 16

| Ingredient (—) | Amount (lbs.) | LOI Contributor (lbs.) |
|---|---|---|
| Ottawa F75 | 2500 | 0 |
| Plenco 14995 | 76.0 | 76.0 |
| Salicyclic Acid | 2.0 | 2.0 |
| Plenco 14289 (40%) | 26.0 | 10.4 |
| Quench Water | 20 | 0 |
| Salicylic Acid | 1.4 | 1.4 |
| Bentonite | 6.0 | 0 |
| Calcium Stearate | 1.7 | 1.7 |
| TOTAL | 2633.1 | 91.5 |
| TOTAL SANS WATER | 2597.5 | 3.52% |

Each of Examples 8-10 were evaluated for hot tensile strength and stick point in the manner discussed above with respect to the zeolite examples. Each Example includes three or four runs, and Table 22, below, reports the results of these evaluations. As can be seen in Table 22, the addition of bentonite in the listed amounts did not appear to significantly affect the hot tensile strengths of the resin-coated substrate compositions.

TABLE 22

Stick Point and Hot Tensile Strength of Bentonite Examples

| Example (#) | Run (#) | Stick Point (° F.) | Hot Tensile Strength (psi) | SST (° F.) |
|---|---|---|---|---|
| 12 | 1 | 196 | 274 | 324 |
| 12 | 2 | 197 | 310 | 324 |
| 12 | 3 | 197 | 340 | 325 |
| 13 | 1 | 200 | 324 | 325 |
| 13 | 2 | 201 | 314 | 325 |
| 13 | 3 | 201 | 300 | 320 |
| 14 | 1 | 201 | 316 | 320 |
| 14 | 2 | 202 | 314 | 320 |
| 14 | 3 | 203 | 298 | 317 |
| 14 | 4 | 197 | 289 | 317 |

Example 15 (shown in Table 23 below) also included a resin-coated sand composition in which the additive was bentonite clay. This composition was evaluated for its efficacy in reducing volatile component emissions. The results of this analysis are shown in Table 24, immediately below Table 23. As can be seen from the results shown in Table 24, the resin-coated substrate composition using bentonite as the additive is also effective at reducing volatile component emissions.

TABLE 23

| Ingredient (—) | Amount (lbs.) | LOI Contributor (lbs.) |
|---|---|---|
| Ottawa F75 | 2500 | 0 |
| Plenco 14995 | 75.9 | 75.9 |
| Salicyclic Acid | 1.0 | 1.0 |
| Plenco 14289 (40%) | 24.7 | 9.9 |
| Quench Water | 20 | 0 |
| Salicylic Acid | 2.4 | 2.4 |
| Bentonite | 6.0 | 0 |
| Calcium Stearate | 1.7 | 1.7 |
| TOTAL | 2631.7 | 90.88 |
| TOTAL SANS WATER | 2596.9 | 3.50% |

TABLE 24

| Compounds Detected | Amount (µg) | Amount (µg/g) |
|---|---|---|
| Total Organics | 63.159 | 59.526 |
| Ammonia | 15.638 | 14.739 |
| Formaldehyde | — | — |
| Phenol | 6.854 | 6.463 |

To determine the efficacy of certain odor control agents in masking or eliminating odor caused by ammonia, phenol and/or formaldehyde, the following Examples 16 and 17 and Comparative Example 4 were performed. As shown in the below Tables 25 and 26, in each of Examples 16 and 17, the compositions included the odor control agent without the additive described above in order to determine the contribution of the odor control agent (i.e., without the zeolite or bentonite additive) to the overall VOC reduction and odor control performance of the resin-coated substrate compositions. In Comparative Example 4 (i.e., the control, shown in Table 27), however, the composition included the additive (i.e., the Advera PZ zeolite) without the odor control agent.

Example 16

Composition with Odor Control Agent (Lemon QuikAir, available from GOC Technologies, Inc., East Sussex, United Kingdom)

TABLE 25

| Ingredient (—) | Amount (lbs.) | LOI Contributor (lbs.) |
|---|---|---|
| Ottawa F75 | 1000 | 0 |
| Plenco 14995 | 19.4 | 19.4 |
| Plenco 14289 (40%) | 6.32 | 2.528 |
| Quench Water | 12 | 0 |
| Salicylic Acid | 0.8 | 0.8 |
| Lemon QuikAir | 1.5 | 1.5 |
| Calcium Stearate | 0.44 | 0.44 |
| TOTAL | 1040.46 | 24.668 |
| TOTAL SANS WATER | 1024.668 | 2.41% |

Example 17

Composition with Odor Control Agent (Lemon QuikAir 1, available from GOC Technologies, Inc., East Sussex, United Kingdom)

TABLE 26

| Ingredient (—) | Amount (lbs.) | LOI Contributor (lbs.) |
|---|---|---|
| Ottawa F75 | 1000 | 0 |
| Plenco 14995 | 19.4 | 19.4 |
| Plenco 14289 (40%) | 6.32 | 2.528 |
| Quench Water | 12 | 0 |
| Salicylic Acid | 0.8 | 0.8 |
| Lemon QuikAir 1 | 1.5 | 1.5 |
| Calcium Stearate | 0.44 | 0.44 |
| TOTAL | 1040.46 | 24.668 |
| TOTAL SANS WATER | 1024.668 | 2.41% |

Comparative Example 4

Composition with Advera PZ Zeolite

TABLE 27

| Ingredient (—) | Amount (lbs.) | LOI Contributor (lbs.) |
|---|---|---|
| Ottawa F75 | 1000 | 0 |
| Plenco 14995 | 19.4 | 19.4 |
| Plenco 14289 (40%) | 6.32 | 2.528 |
| Quench Water | 8 | 0 |
| Salicylic Acid | 0.8 | 0.8 |
| Advera PZ Zeolite | 2.4 | 0 |
| Calcium Stearate | 0.44 | 0.44 |
| TOTAL | 1037.36 | 23.168 |
| TOTAL SANS WATER | 1025.568 | 2.26% |

Each of the compositions according to Examples 16 and 17 and Comparative Example 4 was evaluated for its efficacy in reducing volatile component emissions. The results of these analyses are shown in Tables 28-30, below. As can be seen from the results shown in Tables 28 and 29, the resin-coated substrate compositions according to Examples 16 and 17 (including an odor control agent, but no additive) contribute meaningfully to the reduction in VOC emissions. Although Table 30 shows that the composition according to Comparative Example 4 (including the additive, but no odor control agent) registers a steeper reduction in VOC emissions, a comparison of the results from Examples 16 and 17 to the results from Comparative Example 4 shows that both the additive and the odor control agent separately contribute meaningfully to the overall reduction in VOC emissions.

TABLE 28

VOC emissions data for Example 16

| Compounds Detected | Amount (µg) |
| --- | --- |
| Total Organics | 90.3 |
| Ammonia | 13.1 |
| Formaldehyde | — |
| Phenol | 5.6 |

TABLE 29

VOC emissions data for Example 17

| Compounds Detected | Amount (µg) |
| --- | --- |
| Total Organics | 98.6 |
| Ammonia | 11.4 |
| Formaldehyde | — |
| Phenol | 4.5 |

TABLE 30

VOC emissions data for Comparative Example 4

| Compounds Detected | Amount (µg) |
| --- | --- |
| Total Organics | 65.2 |
| Ammonia | 11.0 |
| Formaldehyde | — |
| Phenol | 6.7 |

Although various embodiments of the invention have been described, additional modifications and variations will be apparent to those skilled in the art. For example, the composition and system may have additional components, which may be present in various suitable amounts, for example, other additives suitable to improve strength, reduce odor, and/or otherwise modify the properties of the composition and a resin-coated sand manufactured using the system. Similarly, the method of preparing the resin-coated substrate as described herein by way of example embodiments may be modified in accordance with the knowledge in the field to which the various embodiments pertain. For example, the method of preparing a resin-coated substrate may include additional steps, may be performed at various temperatures, and/or may be otherwise suitably modified (e.g., as already described with reference to the composition and the system). The invention is not limited to the embodiments specifically disclosed, and the composition, the system for manufacturing a resin-coated substrate, and the method preparing the resin-coated substrate may be modified without departing from the invention, which is limited only by the appended claims and equivalents thereof.

Throughout the text and claims, use of the word "about" reflects the penumbra of variation associated with measurement, significant figures, and interchangeability, all as understood by a person having ordinary skill in the art to which this invention pertains. Further, a used herein, the term "substantially" is used as a term of approximation and not as a term of degree, and is intended to account for normal variations and deviations in the measurement or assessment associated with the composition, the system for manufacturing a resin-coated substrate, and the method preparing the resin-coated substrate (e.g., in the description of physical or chemical properties of a various components or compositions and in the description of amounts of various components).

What is claimed is:

1. A resin-coated substrate composition, comprising a mixture comprising:
    a pre-cured resin-coated substrate comprising a particulate substrate coated with a partially cured polymer resin; and
    an additive comprising bentonite and/or a zeolite present in the resin-coated substrate composition in an amount of 0.03 to 0.5 wt %,
    wherein upon additional cure of the partially cured polymer resin:
    the resin-coated substrate composition registers an ammonia emission of about 15 ppm or less as detected by gas chromatography/mass spectrometry, and/or
    the resin-coated substrate composition registers a phenol emission of about 20 ppm or less as detected by gas chromatography/mass spectrometry, and/or
    an amount of formaldehyde emission of the resin-coated substrate composition is undetectable by gas chromatography/mass spectrometry, and/or
    the resin-coated substrate composition registers a total volatile component emission of less than about 100 ppm as detected by gas chromatography/mass spectrometry.

2. The resin-coated substrate composition according to claim 1, wherein the additive comprises a zeolite having an average particle size of about 1 micron to about 10 microns.

3. The resin-coated substrate composition according to claim 1, wherein the additive comprises a zeolite having an average pore size of about 2 Å to about 14 Å.

4. The resin-coated substrate composition according to claim 1, wherein the additive comprises bentonite particles in which about 50% to about 90% of the bentonite particles have a particle size of about 200 mesh or less.

5. The resin-coated substrate composition according to claim 1, wherein the particulate substrate comprises silica-based sand.

6. The resin-coated substrate composition according to claim 1, wherein the partially cured polymer resin comprises a phenolic resin, a novolac resin, a resole resin, a urea-formaldehyde resin, or a combination thereof.

7. The resin-coated substrate composition according to claim 1, wherein the partially cured polymer resin comprises a phenolic resin and/or a novolac resin.

8. The resin-coated substrate composition according to claim 1, further comprising a cross-linking agent.

9. The resin-coated substrate composition according to claim 8, wherein the cross-linking agent comprises hexamethylene tetramine.

10. The resin-coated substrate composition according to claim 1, further comprising a compatibilizing agent, a de-veining agent, a mold release agent and/or an odor control agent.

11. The resin-coated substrate composition according to claim 1, wherein the additive is present in an amount of about 0.035 wt % to about 0.5 wt % based on a total weight of the resin-coated substrate composition.

12. The resin-coated substrate composition according to claim 1, wherein the resin-coated substrate composition registers an ammonia emission of about 15 ppm or less as detected by gas chromatography/mass spectrometry.

13. The resin-coated substrate composition according to claim 1, wherein the resin-coated substrate composition registers a phenol emission of about 20 ppm or less as detected by gas chromatography/mass spectrometry.

14. The resin-coated substrate composition according to claim 1, wherein an amount of formaldehyde emission of the resin-coated substrate composition is undetectable by gas chromatography/mass spectrometry.

15. The resin-coated substrate composition according to claim 1, wherein the resin-coated substrate composition registers a total volatile component emission of less than about 100 ppm as detected by gas chromatography/mass spectrometry.

16. A method of preparing a resin-coated substrate composition, the method comprising:
   heating a particulate substrate to form a heated particulate substrate;
   mixing the heated particulate substrate with a polymer resin and partially curing the polymer resin on the particulate substrate to form a pre-cured resin-coated substrate; and
   mixing an additive with the pre-cured resin-coated substrate, the additive comprising bentonite or a zeolite in an amount of 0.03 to 0.5 wt % of the resin-coated substrate composition,
   wherein upon additionally curing the pre-cured resin-coated substrate:
   the resin-coated substrate composition registers an ammonia emission of about 15 ppm or less as detected by gas chromatography/mass spectrometry, and/or
   the resin-coated substrate composition registers a phenol emission of about 20 ppm or less as detected by gas chromatography/mass spectrometry, and/or
   an amount of formaldehyde emission of the resin-coated substrate composition is undetectable by gas chromatography/mass spectrometry, and/or
   the resin-coated substrate composition registers a total volatile component emission of less than about 100 ppm as detected by gas chromatography/mass spectrometry.

17. The method according to claim 16, further comprising mixing a cross-linking agent, an odor control agent, a compatibilizing agent, a mold release agent and/or a deveining agent with the heated particulate substrate, the polymer resin or the additive.

18. The method according to claim 16, further comprising adding an accelerant to the heated particulate substrate, the polymer resin or the additive.

19. A composition, comprising a foundry sand comprising the resin-coated substrate composition according to claim 1.

20. A composition, comprising a proppant sand comprising the resin-coated substrate composition according to claim 1.

* * * * *